United States Patent [19]
Takagi et al.

[11] Patent Number: 4,779,002
[45] Date of Patent: Oct. 18, 1988

[54] METHOD AND APPARATUS FOR MEASURING OPTICAL CUTTING BEAM WITH PARALLEL BEAM REFERENCING

[75] Inventors: Yuji Takagi, Yokohama; Seiji Hata, Fujisawa, both of Japan

[73] Assignee: Hitachi, Ltd., Tokyo, Japan

[21] Appl. No.: 109,313

[22] Filed: Oct. 19, 1987

[30] Foreign Application Priority Data

Oct. 17, 1986 [JP] Japan ................................. 61-245225

[51] Int. Cl.⁴ ............................................ G01N 21/86
[52] U.S. Cl. ..................................... 250/560; 356/376
[58] Field of Search ............... 250/560, 561, 234, 235, 250/236; 356/376, 381, 382, 1, 4

[56] References Cited

U.S. PATENT DOCUMENTS 4,645,917 2/1987 Penney et al. ....................... 250/560
4,731,853 3/1988 Hata et al. ............................ 356/376

Primary Examiner—David C. Nelms
Attorney, Agent, or Firm—Antonelli, Terry & Wands

[57] ABSTRACT

A method and an apparatus suitably used with a visual recognition system or the like for measuring the shape of an object by the optical cutting process is disclosed in which irregularities of the reflection characteristics on the object or under an environment subjected to variations in external light are removed for measurement. A light flux parallel to a slit beam providing an optical cutting beam is irradiated on the object by an optical system. An original image not irradiated with any parallel illumination light is compared with an image obtained with a parallel beam irradiated to obtain reflection characteristics data on the object. This reflection characteristic data is used to correct an image formed at the time of irradiation of the optical cutting beam. When the optical cutting beam is irradiated, the existing image representing reflection characteristics is standardized with reference to the brightness of the optical cutting beam. The resulting data is used to correct the differential image obtained by subtraction between the image irradiated with the optical cutting beam and the original image. The reflection irregularties are thus removed for an improved measurement accuracy.

3 Claims, 5 Drawing Sheets

METHOD AND APPARATUS FOR MEASURING OPTICAL CUTTING BEAM WITH PARALLEL BEAM REFERENCING

BACKGROUND OF THE INVENTION

The present invention relates generally to a method and an apparatus for measuring the shape of an object by using an optical cutting process for a visual recognition device or the like, or more in particular to a method and an apparatus for measurement with an optical cutting beam suitable for use in an environment subject to variations in external light or in the case where the reflection characteristics on the object are irregular.

In a conventional optical cutting beam measuring apparatus for a visual recognition system, as disclosed in No. JP-A-59-197810, subtraction is effected between an image irradiated with an optical cutting beam and an original image not so irradiated, and by thus removing the effect of the background light, the optical cutting beam is stably extracted.

Specifically, according to the conventional optical cutting beam measurement method, first, the original image of an object is picked up and stored in an image memory or the like. Then, a slit light beam is projected on the object, and the original image is subtracted from the image thus obtained thereby to produce a differential image. This subtraction between images offsets the parts other than the slit light beam (optical cutting beam). That is to say, any part in the background which may be bright has no effect. In actual practice, small noises that are caused in parts other than the slit beam when the differential image is produced can be removed by an appropriate threshold process. After the optical cutting beam is separated from the background, the position of the optical cutting beam is determined by thinning or statistical means. In this method, as far as the radiation surface is uniform, the brightness change of the optical cutting beam assumes a symmetric form, thereby facilitating the determination of a central value. To the extent that the light reflection characteristics of the surface of the object are irregular such as in the case where white numerals exist on the object surface and are covered by the optical cutting beam, however, the brightness of the optical cutting beam undergoes a variation. If a central value is determined from this brightness variation, the resulting figure would be deflected toward a higher reflection factor, thereby causing a problematic deterioration of the measurement accuracy.

SUMMARY OF THE INVENTION

The object of the present invention is to provide a method and an apparatus for measurement with an optical cutting beam which are difficult to be affected by changes in external light or by the irregularaties of the reflection characteristics on the surface of an object.

In order to achieve the aforementioned object, there is provided according to the present invention an apparatus for measuring an optical cutting beam, comprising an optical system for irradiating a light flux parallel to the slit beam projected with the optical cutting beam on an object, in which an original image obtained when the parallel light is not projected is compared with an image obtained when the parallel illumination light is projected thereby to produce data on the reflection characteristics of the object, so that the image formed by irradiation of the optical cutting beam is corrected by data representing reflection characteristics. In this configuration, an image of the existing reflection characteristics is standardized on the basis of the brightness of the optical cutting beam, and this data is used to correct the differential image formed by subtraction between the image formed by irradiation of the optical cutting beam and the original image. In this manner, the reflection irregularities are removed and the measurement accuracy improved.

DESCRIPTION OF THE PREFERRED EMBODIMENTS

An embodiment of the present invention will be explained below with reference to FIGS. 1 to 5.

Figure 1:
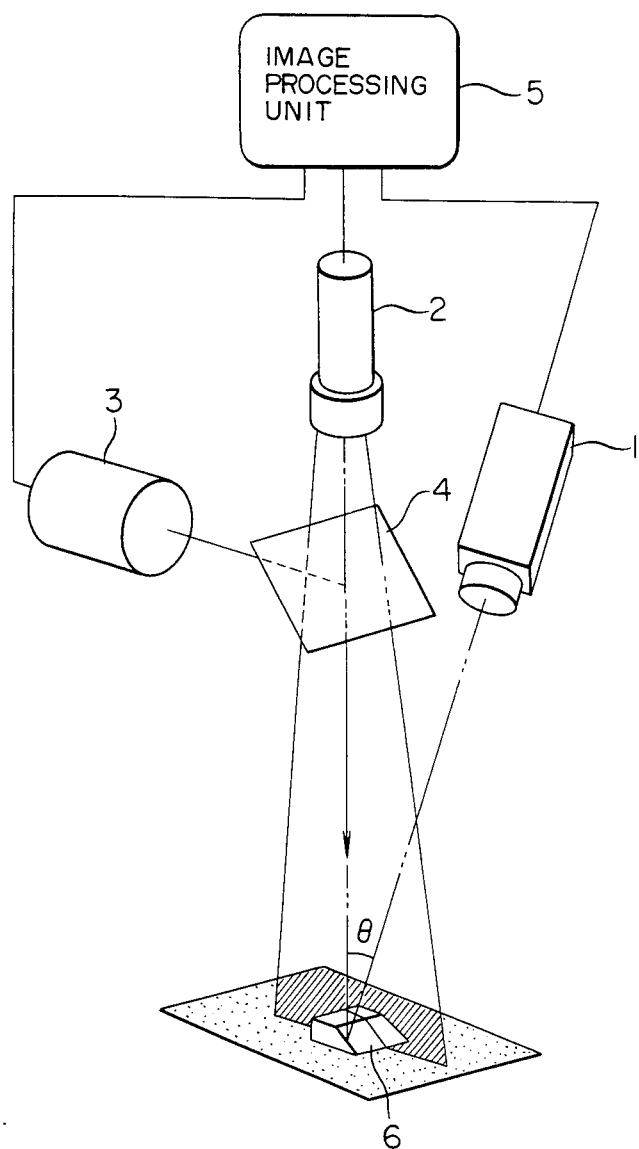
FIG. 1 is a diagram showing a configuration of an optical cutting beam measuring apparatus according to an embodiment of the present invention.

A configuration of an optical cutting beam measuring apparatus according to an embodiment of the present invention is shown in FIG. 1. In FIG. 1, reference numeral 1 designates a TV camera, numeral 2 a slit beam projector for projecting an optical cutting beam on an object, numeral 3 a parallel beam illumination device for projecting a light flux having substantially the same diameter as tubular enclosure, and numeral 4 a half mirror adapted to irradiate the object 6 with the light beam from the parallel light beam illumination unit 3 in the same direction as the slit beam. Numeral 5 designates an image processing unit for analyzing the image produced from the TV camera. The unit 5 also controls the slit beam projector 2 and the projector for the parallel beam illumination unit 3.

A method of removing the effect of the reflection irregularities on the surface of the object will be explained with reference to FIGS. 2a to 2c and FIGS. 3a to 3c.

Figure 2A:
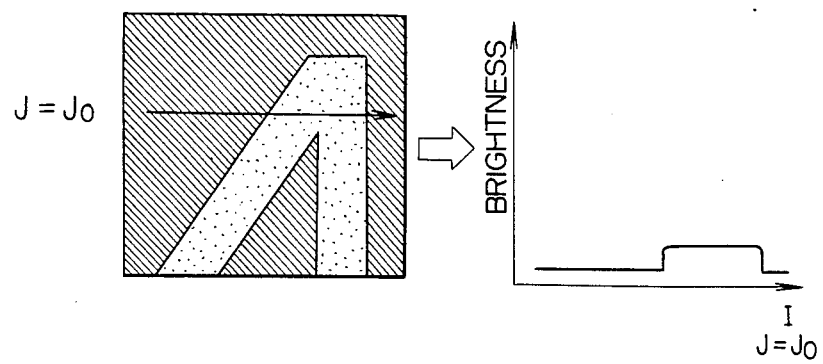
FIGS. 2a, 2b and 2c and FIGS. 3a, 3b and 3c are diagrams for explaining the procedure for removing irradiation irregularities in an optical cutting beam measuring method according to the present invention.
Figure 2B:
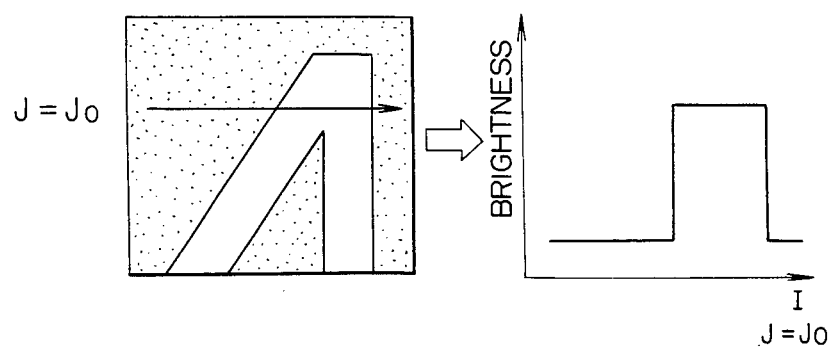
Figure 3A:
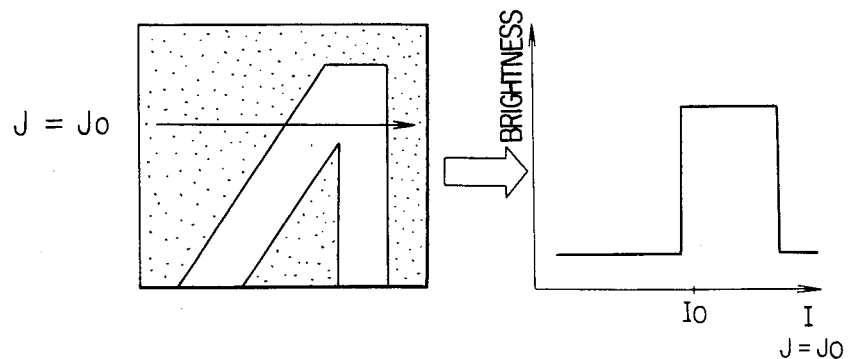

First, an original image such as shown in FIG. 2a is picked up by the TV camera. The parallel beam illumination unit 3 is then lit and the image involved (FIG. 2b) is picked up by the TV camera 1. In view of the intensity of the lights irradiated between the original image and the parallel beam image, a differential image therebetween, if obtained, has a brightness data proportional to the light reflection characteristics of the object as shown in FIG. 3a.

Figure 2C:
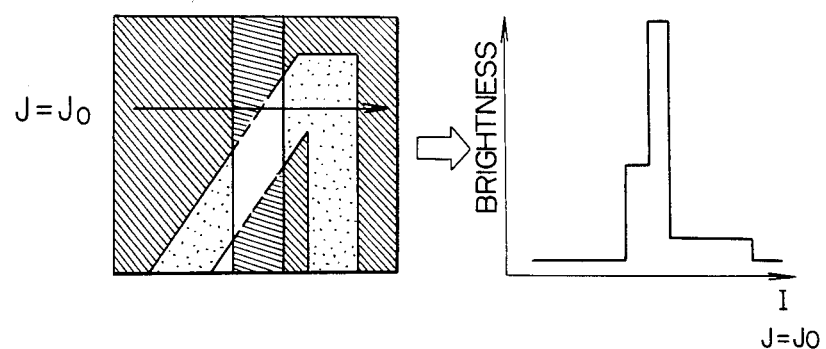

The slit beam projector 2 is then lit (with the parallel beam illumination unit 3 turned off) to produce an image shown in FIG. 2c. In order to remove the effect of the background light in the image, as in the method explained with reference to the prior art, the original image of FIG. 2a is subtracted from the image of FIG. 2c thereby to produce a differential image shown in FIG. 3b.

Figure 3B:
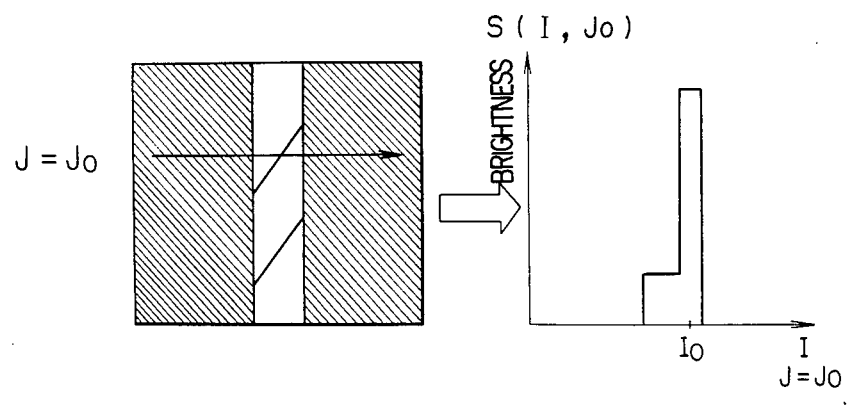

The graph of FIG. 3b shows a brightness distribution on the scanning line for the differential image $J=J_0$.

The irregularities of the reflection characteristics on the object surface causes a distortion of the brightness distribution of the slit beam. This distortion is removed by use of the differential image of FIG. 3a containing the reflection characteristics data of the object surface.

Now, explanation will be made of a method of removing a scanning line $J=J_0$ on the image. First, the I coordinate value $I_0$ of the brightest point on the differential image of the slit beam in FIG. 3b. Then, on the assumption that the brightness of $I=I_0$ on the same scanning line $J=J_0$ in FIG. 3a as 1 in value, other brightness values on the same scanning line $J=J_0$ are standardized. This standardized data is assumed to be $$R(I, J_n) (R(I_0, J_0)=1)$$

and the brightness data of the slit beam differential image in FIG. 3b as $$S(I, J_0)$$

the corrected data $B(I, J_0)$ is determined as $B(I, J_0)=S(I, J_0)/R(I, J_0)$

Figure 3C:
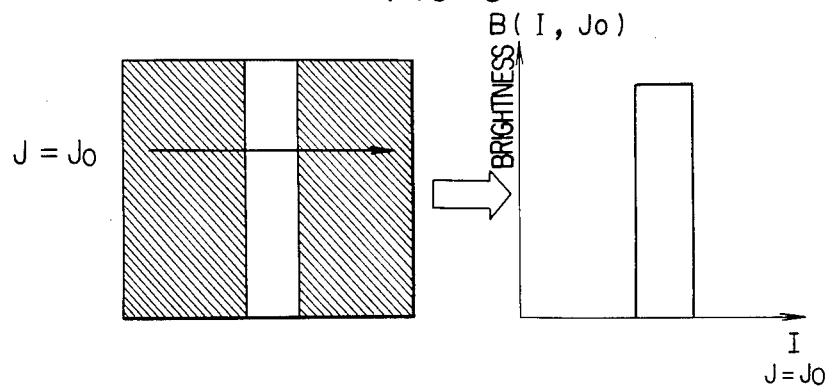
Figure 4:
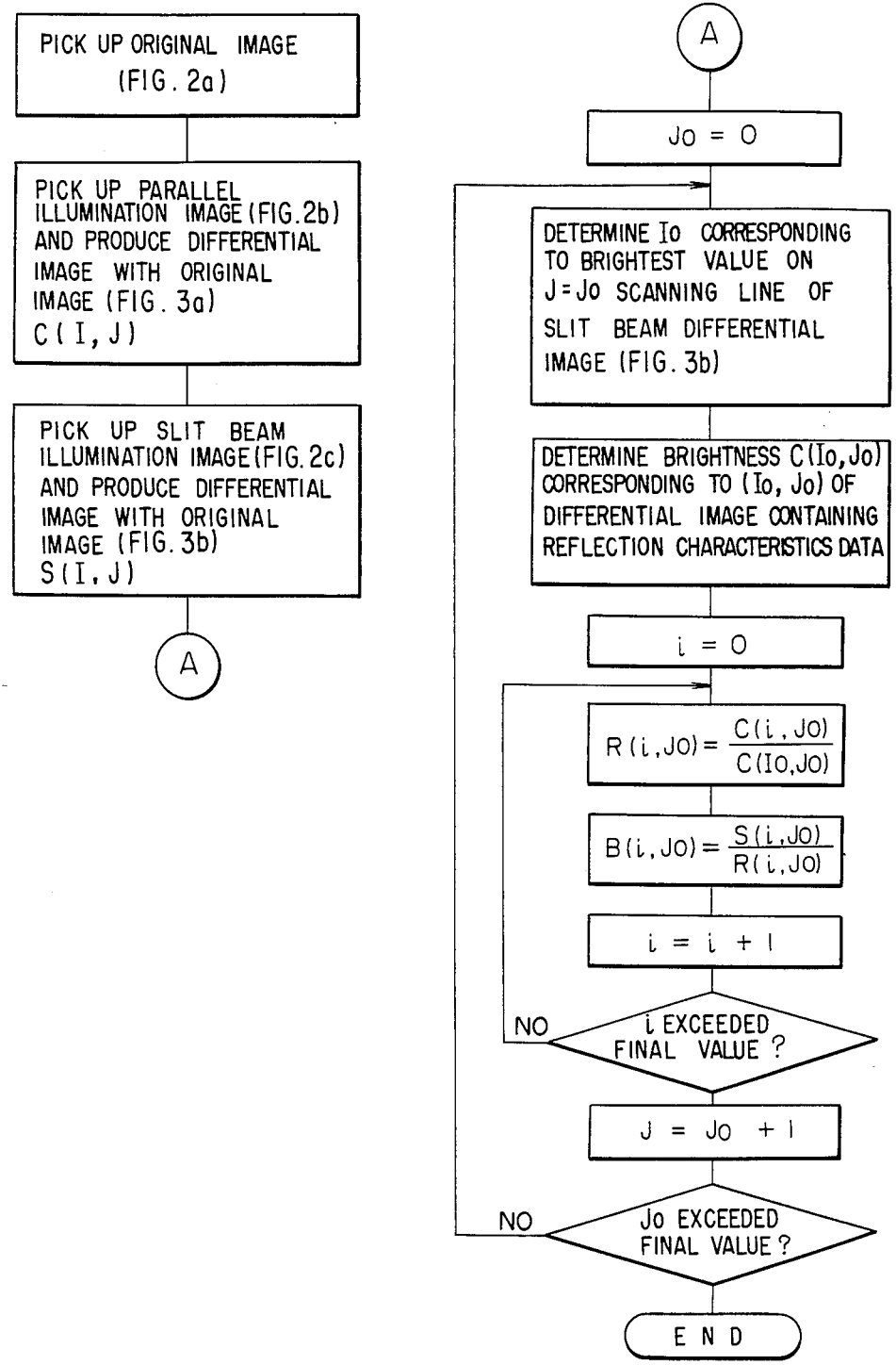
FIG. 4 is a flowchart showing the steps of the optical cutting beam measuring method according to the present invention.

When corrected data on all the scanning lines are obtained by repeating this step, an image shown in FIG. 3c is acquired, thus correcting the reflection irregularities in the slit beam.

Figure 5:
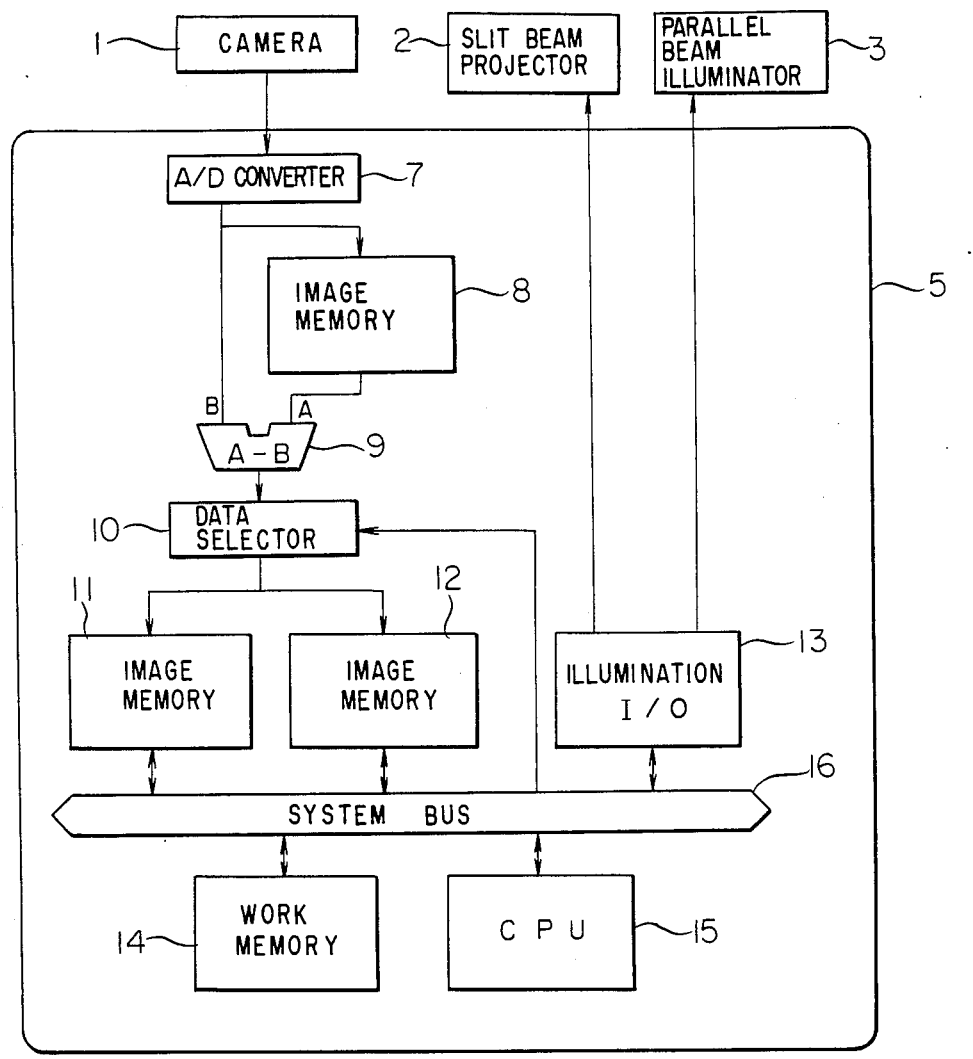
FIG. 5 is a diagram showing a configuration of an image processing unit for the optical cutting beam measuring apparatus according to the present invention.

Now, the operation of the image processing unit 5 used for the aforementioned process will be explained with reference to FIG. 5.

First, a command is sent from the CPU 15 to an illumination I/O 13 to light the parallel light 3, so that an image under irradiation of parallel beams is picked up by the camera 1, and an image signal digitized by the A/D converter 7 is introduced into the image memory 8. A command is applied from the CPU 15 to the illumination I/O 13 to turn off the parallel light 3, and the image after the turning off (original image) is formed by the camera 1, so that an image signal digitized by the A/D converter 7 is obtained. In the process, in synchronism with this operation, the parallel-light-irradiated image stored in the image memory 8 is read out, and the differential between the two images is taken by the differential processor 9 thereby to produce an image data (hereinafter called "the reflection factor map data") containing the brightness data proportional to the light reflection characteristics shown in FIG. 3a. At the same time, a command is sent from the CPU 15 to a data selector 10 in such a manner that the image data sent from the differential processor 9 is applied to the image memory 11 with the reflection factor data stored in the image memory 11.

A command is then sent from the CPU 15 to the illumination I/O 13 to light the slit beam projector 2, and a slit beam irradiated image is formed by the camera 1, so that an image signal digitized by the A/D converter 7 is introduced into the image memory 8. A command is sent from the CPU 15 to the illumination I/O 13 thereby to turn off the slit beam light 2, and the image after the turning off (original image) is picked up by the camera 1, with the result that an image signal digitized by the A/D converter 7 is obtained, thus applying data to the differential processor 9. In synchronism with this process, the slit beam irradiated image stored in the image memory 8 is read out, and the difference between the two images is determined by the differential processor 9, so that a differential image shown in FIG. 3b is obtained. The data selector 10 is thus controlled by the CPU 15 and the output data stored in the image memory 12.

The reflection factor map data stored in the image memory is read by the CPU 15, and the reflection factor normalized data $R(I, J)$ computed as above is stored in the memory 11. In this process, the brightness level is not necessarily in the range from 0 to 1, but may be 0 to 100 or 0 to 255 in the case where an 8-bit parallel data memory is used, the only requirement being that when the corrected data $B(I, J_0)$ is computed, the following equation is obtained:

$$B(I, J_0)=S(I, J_0)/(R(I, J_0)/MAX) \quad (1)$$

$$(J_0=0 \text{ to } 239)$$

where MAX is a maximum value. By using the reflection factor normalized data stored in the memory 11 and the slit beam differential image stored in the memory 12, the computation of equation (1) is processed in the CPU 15, and the corrected data $B(I, J_0)$ is written in the image memory 11, 12 or a work memory 14. The resulting data is used to effect optical extraction in the manner specified in No. JP-A-59-197810 and the result is written in the work memory 14.

The manner in which this process is used for optical extraction process in such a manner as described in No. JP-A-61-95203 will be explained.

In a screen of 256×240, for example, assume that the brightness of the I-th pixel $(0<I<255)$ on the J-th line $(0<J<239)$ is $M(I)$. The position $X(J)$ of the optical cutting beam is defined as follows:

$$X(J) = \frac{\sum_{I=0}^{255} I \times M(I)}{\sum_{I=0}^{255} I}$$

This is a weighted mean of the brightness $M(I)$. Since the image of the optical cutting beam alone contains some noises, however, a threshold value TH for removing noises is determined and used for computation of $X(J)$ only when the brightness $M(I)$ is higher than TH. In the case where there are a plurality of peaks exceeding TH, $X(J)$ is computed where the area of a maximum is largest. The result of computation is written in the work memory 14.

It will thus be understood from the foregoing description that according to the present invention a measurement error of an optical cutting beam caused by the reflection irregularities on the surface of an object as well as the effect of an external light is reduced, and therefore the technique under consideration is applied under a variety of environments without affecting the measurement accuracy.

We claim:

1. A method of measurement with an optical cutting beam for picking up an object irradiated by an optical cutting beam to measure the shape of the object by analysis, comprising the steps of:
    picking up a first image that is an image of an object not irradiated with any additional light;
    picking up a second image that is an image of the object irradiated with a parallel beam;
    determining a differential image between the first and second images and measuring light reflection irregularities on the surface of the object from the differential image; and correcting the reflection irregularities caused at the time of irradiation of the optical cutting beam by means of the above-mentioned measurement.

2. A method of measurement with an optical cutting beam according to claim 1, wherein an image representing reflection characteristics of the differential image is standardized with reference to the brightness of the optical cutting beam, and the differential image between the first image and a third image that is an image of the object irradiated with the optical cutting beam is corrected.

3. An apparatus for measurement with optical cutting beam comprising:
a camera for picking up an image of an object;
a slit beam projector for irradiating the object with an optical cutting beam;
a parallel beam illumination system for irradiating for irradiating the object from the same direction as the slit beam for optical cutting; and
an image processing unit for measuring the light reflection irregularities on the surface of an object of measurement from the differential image between an image of the object irradiated with no additional light and an image of the object irradiated with a parallel beam, and correcting the reflection irregularities caused at the time of irradiation of the optical cutting beam by means of the measurement.

* * * * *